(12) United States Patent
Kim et al.

(10) Patent No.: US 9,554,120 B2
(45) Date of Patent: Jan. 24, 2017

(54) APPARATUS AND METHOD FOR GENERATING DEPTH IMAGE USING TRANSITION OF LIGHT SOURCE

(71) Applicant: Samsung Electronics Co., Ltd., Suwon-si (KR)

(72) Inventors: Sun Kwon Kim, Gunpo-si (KR); Kee Chang Lee, Yongin-si (KR); Ouk Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 774 days.

(21) Appl. No.: 13/758,162

(22) Filed: Feb. 4, 2013

(65) Prior Publication Data

US 2014/0002609 A1 Jan. 2, 2014

(30) Foreign Application Priority Data

Jun. 29, 2012 (KR) .................. 10-2012-0070889

(51) Int. Cl.
*H04N 13/02* (2006.01)
*G06T 7/00* (2006.01)

(52) U.S. Cl.
CPC ......... *H04N 13/0253* (2013.01); *G06T 7/0073* (2013.01); *H04N 13/0271* (2013.01)

(58) Field of Classification Search
None
See application file for complete search history.

(56) References Cited

U.S. PATENT DOCUMENTS

| | | | |
|---|---|---|---|
| 2003/0198290 A1* | 10/2003 | Millin | H04N 19/597 375/240.01 |
| 2009/0213240 A1* | 8/2009 | Sim | G06T 17/00 348/222.1 |
| 2009/0297020 A1 | 12/2009 | Beardsley et al. | |
| 2011/0123183 A1 | 5/2011 | Adelsberger et al. | |
| 2012/0287247 A1* | 11/2012 | Stenger | H04N 13/0253 348/47 |
| 2013/0127994 A1* | 5/2013 | Mihelich | H04N 19/20 348/46 |
| 2013/0129190 A1* | 5/2013 | Cohen | G06T 7/0075 382/154 |
| 2014/0028678 A1* | 1/2014 | Chmielewski | G06T 5/002 345/426 |

FOREIGN PATENT DOCUMENTS

| | | |
|---|---|---|
| KR | 10-2003-0034274 | 5/2003 |
| KR | 10-2010-0064031 | 6/2010 |
| KR | 10-2011-0064622 | 6/2011 |
| KR | 10-2012-0056668 | 6/2012 |
| KR | 10-2012-0058828 | 6/2012 |
| PL | WO 2012089263 A1 * 7/2012 ............. G06T 5/002 |

* cited by examiner

*Primary Examiner* — Bernard Krasnic
(74) *Attorney, Agent, or Firm* — Harness, Dickey & Pierce, P.L.C.

(57) ABSTRACT

An apparatus and method for generating a depth image using transition of light sources may include a surface information determination unit to determine surface information related to a surface of an object, using a plurality of intensity images generated according to position of light sources; and an output depth image generation unit to generate an output depth image, using an original depth image and the surface information.

17 Claims, 22 Drawing Sheets

APPARATUS AND METHOD FOR GENERATING DEPTH IMAGE USING TRANSITION OF LIGHT SOURCE

CROSS-REFERENCE TO RELATED APPLICATIONS

This application claims the priority benefit of Korean Patent Application No. 10-2012-0070889, filed on Jun. 29, 2012, in the Korean Intellectual Property Office, the disclosure of which is incorporated herein by reference.

BACKGROUND

1. Field

One or more example embodiments of the following description relate to a depth image generation apparatus and method, and more particularly, to an apparatus and method for generating a depth image using transition of light sources.

2. Description of the Related Art

With an increase in use of a 3-dimensional (3D) image, technologies for generating a depth image necessary for generation of the 3D image are developing.

Among the technologies for generating a depth image, a time of flight (TOF) method determines a distance between an object and a depth camera using a phase difference between an output light emitted from a light source and a received light received by a sensor of the depth camera.

However, according to the TOF method, when intensity of the received light is out of a measurable range of the sensor of the depth camera, a saturation region in which the distance from the camera to a corresponding region is indeterminable may be generated.

In addition, when an integration time for measuring the received light is reduced to reduce the saturation region, a signal to noise ratio (SNR) may be increased, consequently reducing quality of the depth image.

Accordingly, there is demand for a method for generating a depth image without a saturation region while maintaining image quality.

SUMMARY

The foregoing and/or other aspects are achieved by providing a depth image generation apparatus including a surface information determination unit to determine surface information related to a surface of an object, using a plurality of intensity images generated according to position of light sources; and an output depth image generation unit to generate an output depth image, using an original depth image and the surface information.

The depth image generation apparatus may further include an image receiving unit to receive a plurality of original depth images generated according to the position of the light sources.

The depth image generation apparatus may further include a saturation region removal unit to remove a saturation region from the output depth image using the plurality of original depth images.

The saturation region removal unit may include a matching region search unit to search for matching regions corresponding to the saturation region of the output depth image from the plurality of original depth images; and a region removal unit to remove the saturation region from the output depth image by adding depth information of the matching regions to the saturation region of the output depth image.

The depth image generation apparatus may further include an image receiving unit to receive a plurality of original depth images generated according to a number of the light sources.

The depth image generation apparatus may further include a noise and region removal unit to remove noise and a saturation region from the output depth image generated using the plurality of original depth images.

The noise and region removal region may include a depth image search unit to search for a first depth image having a lowest level of noise and a second depth image having a smallest size of a saturation region among the plurality of original depth images; a noise removal unit to remove noise of the output depth image by comparing the output depth image with the first depth image; and a region removal unit to remove a saturation region of the output depth image by comparing the output depth image with the second depth image.

The foregoing and/or other aspects are achieved by providing a depth image generation apparatus including an original depth image receiving unit to receive a plurality of original depth images generated by photographing an object according to position of light sources; and an output depth image generation unit to generate an output depth image from which a saturation region is removed using the plurality of original depth images.

The output depth image generation unit may include a saturation region recognition unit to recognize a saturation region of a first depth image among a plurality of depth images; a matching region search unit to search for matching regions corresponding to the saturation region of the first depth image among the plurality of depth images; and a saturation region removal unit to generate an output depth image from which the saturation region is removed, by adding depth information of the matching regions to the saturation region of the first depth image.

The foregoing and/or other aspects are also achieved by providing a depth image generation apparatus including an original depth image receiving unit to receive a plurality of original depth images generated by photographing an object according to a number of light sources; and an output depth image generation unit to generate an output depth image of which a level of noise and a size of a saturation region are minimized using the plurality of original depth images.

The output depth image generation unit may include a depth image search unit to search for a first depth image having a lowest level of noise and a second depth image having a smallest size of a saturation region among the plurality of original depth images; and a depth image combination unit to generate the output depth image by combining the first depth image and the second depth image.

The foregoing and/or other aspects are also achieved by providing a depth image generation method including determining surface information related to a surface of an object using a plurality of intensity images generated according to position of light sources; and generating an output depth image, using an original depth image and the surface information.

The foregoing and/or other aspects are also achieved by providing a depth image generation method including receiving a plurality of original depth images generated by photographing an object according to position of light sources; and generating an output depth image from which a saturation region is removed using the plurality of original depth images.

The foregoing and/or other aspects are also achieved by providing a depth image generation method including receiving a plurality of original depth images generated by photographing an object according to a number of light sources; and generating an output depth image of which a level of noise and a size of a saturation region are minimized using the plurality of original depth images.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
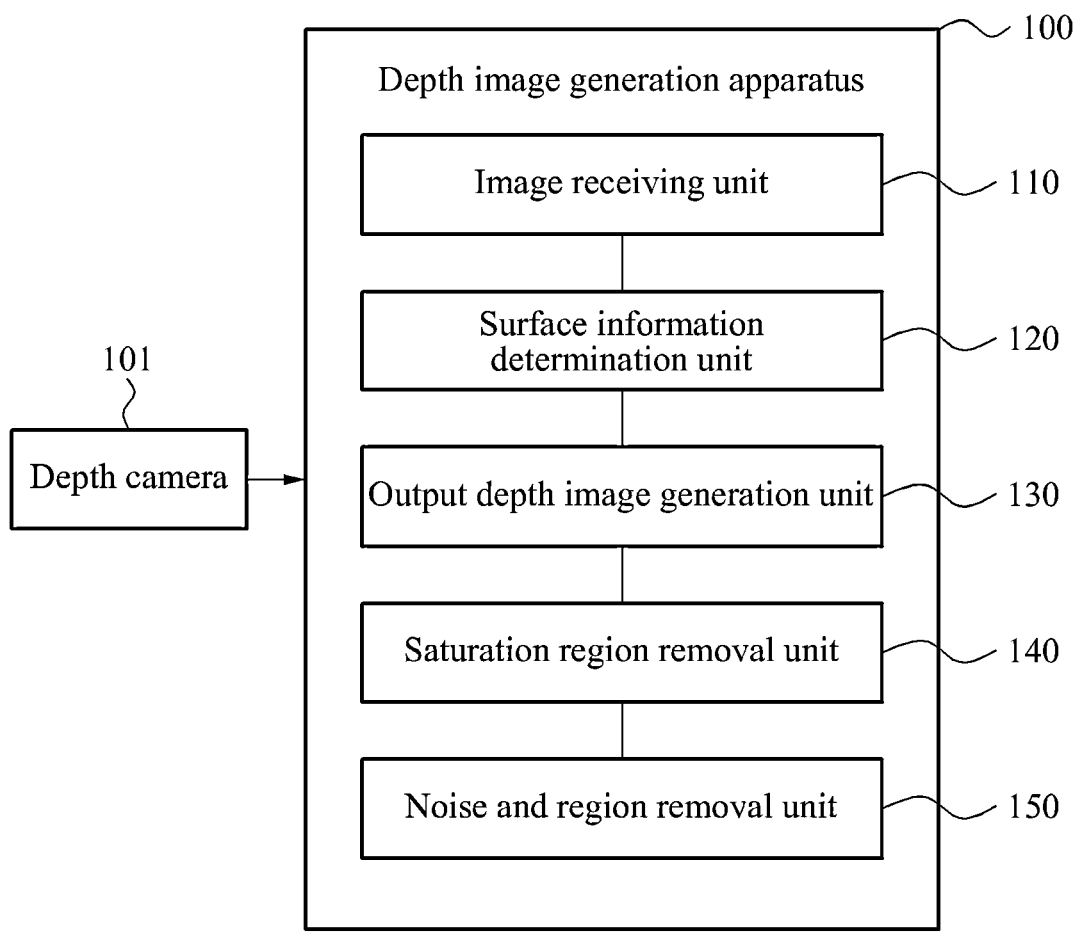
FIG. 1 illustrates a depth image generation apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a depth image generation apparatus 100 according to example embodiments.

Referring to FIG. 1, the depth image generation apparatus 100 may include an image receiving unit 110, a surface information determination unit 120, an output depth image generation unit 130, a saturation region removal unit 140, and a noise and region removal unit 150.

The image receiving unit 110 may receive a plurality of original depth images and a plurality of intensity images from a depth camera 101.

The depth camera 101 may be a time of flight (TOF) depth image that determines a distance between an object and the depth camera 101 using light emitted from light sources.

The depth camera 101 may change position of the light sources and generate an intensity image using a received light reflected from the object according to the changed position of the light sources. The intensity image may be a black and white image corresponding to a color image of the object.

In addition, the depth camera 101 may calculate travelling time of light using a phase difference between an output light emitted from the light sources and the received light included in the intensity image. Next, the depth camera 101 may generate an original depth image by determining the distance between the object and the depth camera 101 using the traveling time of light.

That is, the depth camera 101 may generate the plurality of original depth images by changing the position of the light sources and photographing the object according to the changed position. Here, the plurality of original depth images may have respectively different positions of saturation regions. The saturation region may refer to a region in which intensity of the received light is out of a measurable range of a sensor of the depth camera 101 and therefore a distance from the depth camera 101 to a corresponding region is indeterminable.

Furthermore, the depth camera 101 may generate the plurality of original depth images by changing a number of the light sources and photographing the object according to the changed number of the light sources. Here, the plurality of original depth images may have respectively different sizes of the saturation region and different levels of noise.

For example, when including twelve light sources, the depth camera 101 may generate a first depth image and a first intensity image using four light sources located at an upper part of the depth camera 101.

Next, the depth camera 101 may turn off the four light sources located at the upper part and generate a second depth image and a second intensity image using four light sources located at a right side of the depth camera 101.

Next, the depth camera 101 may turn off the four light sources located at the right side and generate a third depth image and a third intensity image using four light sources located at a lower part of the depth camera 101.

Last, the depth camera 101 may turn off the four light sources located at the lower part and generate a fourth depth image and a fourth intensity image using four light sources located at a left side of the depth camera 101.

The depth camera 101 may increase the number of light sources and repeat the foregoing procedures.

The surface information determination unit 120 may determine surface information related to a surface of the object using the intensity images according to the position of the light sources, received by the image receiving unit 110. The surface information may include a normal vector of the object or a unit vector of the normal vector.

Also, the surface information determination unit 120 may determine the surface information of the object using the intensity images and the position of the light sources corresponding to the intensity images. For example, the surface information determination unit 120 may determine the normal vector of the object by a photometric stereo method.

A method of determining the normal vector by the surface information determination unit 120 will be described in detail with reference to FIG. 2.

The output depth image generation unit 130 may generate an output depth image with an increased accuracy, using the original depth images received by the image receiving unit 110 and the surface information determined by the surface information determination unit 120.

The saturation region removal unit 140 may remove a saturation region from the output depth image using the plurality of original depth images received by the image receiving unit 110. Here, the saturation region removal unit 140 may remove the saturation region using a characteristic that a position of a saturation region in an original depth image is determined according to a position of a light source.

The configuration and operation of the saturation region removal unit 140 will be described in detail with reference to FIG. 7.

The noise and region removal unit 150 may remove noise and the saturation region from the output depth image using the plurality of original depth images received by the image receiving unit 110. Here, the noise and region removal unit 150 may remove the noise and the saturation region using a characteristic that a level of noise and a size of a saturation region in an original depth image are determined according to a number of light sources.

The configuration and operation of the noise and region removal unit 150 will be described in detail with reference to FIG. 8.

The saturation region removal unit 140 and the noise and region removal unit 150 may operate independently. Alternatively, the noise and region removal unit 150 may remove noise from the output depth image from which the saturation region is removed by the saturation region removal unit 140.

Also, alternatively, the output depth image generated by the output depth image generation unit 130 may be output without the operation of the saturation region removal unit 140 and the noise and region removal unit 150.

Figure 2:
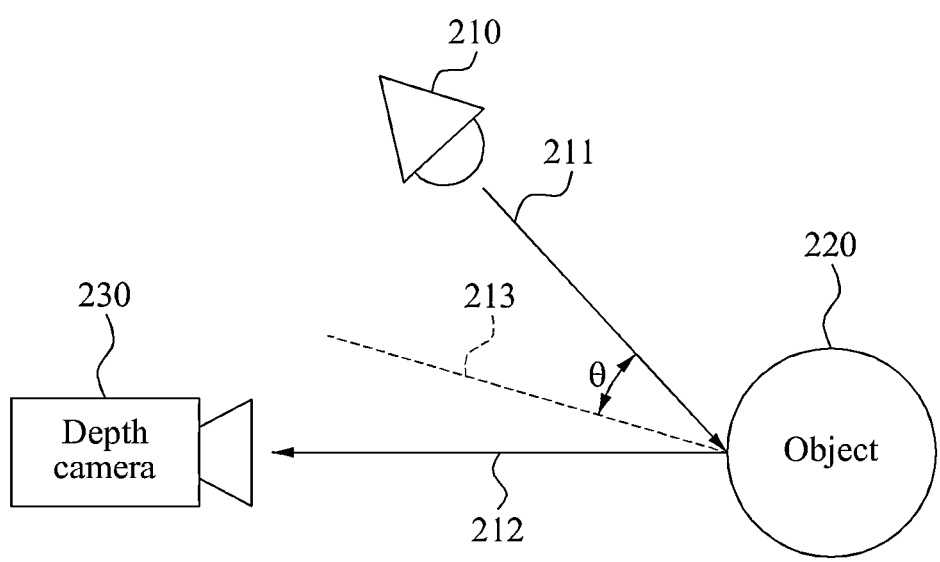
FIG. 2 illustrates a process of determining surface information according to example embodiments.

FIG. 2 illustrates a process of determining surface information according to example embodiments.

A depth camera 230 according to the example embodiments may calculate a travel time of light using a phase difference between an output light 211 emitted from a light source 210 and a received light 212 out of the output light 211, reflected from an object 220 and received by a sensor of the depth camera 230.

When reflectance characteristics of an object surface is the Lambertian surface, intensity I of the received light 212 received by the sensor of the depth camera 230 may be determined using Equation 1.

$$I = I_E \cos\theta = \vec{I}_E L \cdot \vec{N}$$ [Equation 1]

Here, $I_E$ may denote the intensity of the output light 211 and a vector N 213 may denote a normal vector of the object surface. A vector L may denote a vector between the object 220 and the light source 210. The vector L may be the same vector as the output light 211. The intensity I may be proportional to an angle θ between the vector N 213 and the vector L as expressed in Equation 1.

Presuming that $L_1$, $L_2$, $L_3$, and $L_4$ denote positions of the light source 210 and $I_1$, $I_2$, $I_3$, and $I_4$ denote the intensity images generated from the positions $L_1$, $L_2$, $L_3$, and $L_4$, respectively, Equation 1 may be rearranged into Equation 2.

$$\begin{pmatrix} I_1 \\ I_2 \\ I_3 \\ I_4 \end{pmatrix} = \begin{pmatrix} \vec{L}_1^T \\ \vec{L}_2^T \\ \vec{L}_3^T \\ \vec{L}_4^T \end{pmatrix} \cdot \vec{N}$$ [Equation 2]

In addition, Equation 2 may be rearranged into Equation 3 for calculating a normal vector N.

$$\vec{N} = \begin{pmatrix} \vec{L}_1^T \\ \vec{L}_2^T \\ \vec{L}_3^T \\ \vec{L}_4^T \end{pmatrix}^{-1} \cdot \begin{pmatrix} I_1 \\ I_2 \\ I_3 \\ I_4 \end{pmatrix}$$ [Equation 3]

The surface information determination unit 120 of FIG. 1 may determine the normal vector N calculated using Equation 3 as the surface information.

In addition, the surface information determination unit 120 may calculate a unit vector $\hat{N}$ of the normal vector N using Equation 4 and determine the unit vector $\hat{N}$ as the surface information.

$$\hat{N} = \frac{\vec{N}}{|\vec{N}|}$$ [Equation 4]

Figure 3:
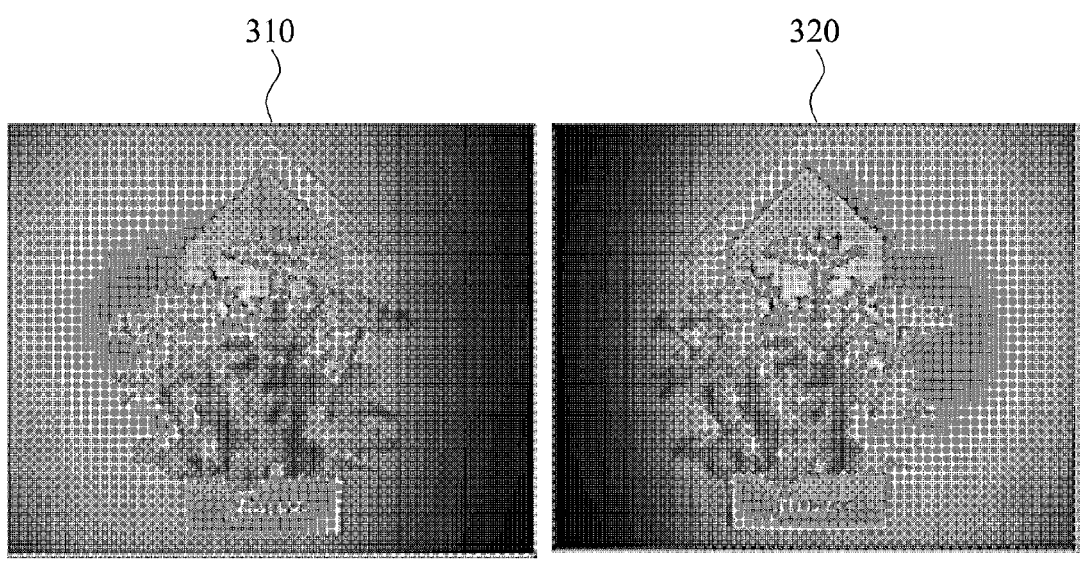
FIG. 3 illustrates an intensity image generated according to example embodiments.

FIG. 3 illustrates an example intensity image generated according to example embodiments.

FIG. 3 shows an intensity image 310 generated by the depth camera 101 when a light source is located at the left side of the depth camera 101, and an intensity image 320 generated by the depth camera 101 when the light source is located at the right side of the depth camera 101.

The intensity images according to the example embodiments may include the received light received by the sensor of the depth camera 101.

That is, an angle by which the output light is reflected from the object may be varied depending on the position of the light source.

Therefore, when the light source is located at the left side of the depth camera 101, the intensity image 310 generated by the depth camera 101 may clearly show information related to a left side of the object as shown in FIG. 3.

When the light source is located at the right side of the depth camera 101, the intensity image 320 generated by the depth camera 101 may clearly show information related to a right side of the object as shown in FIG. 3.

Figure 4:
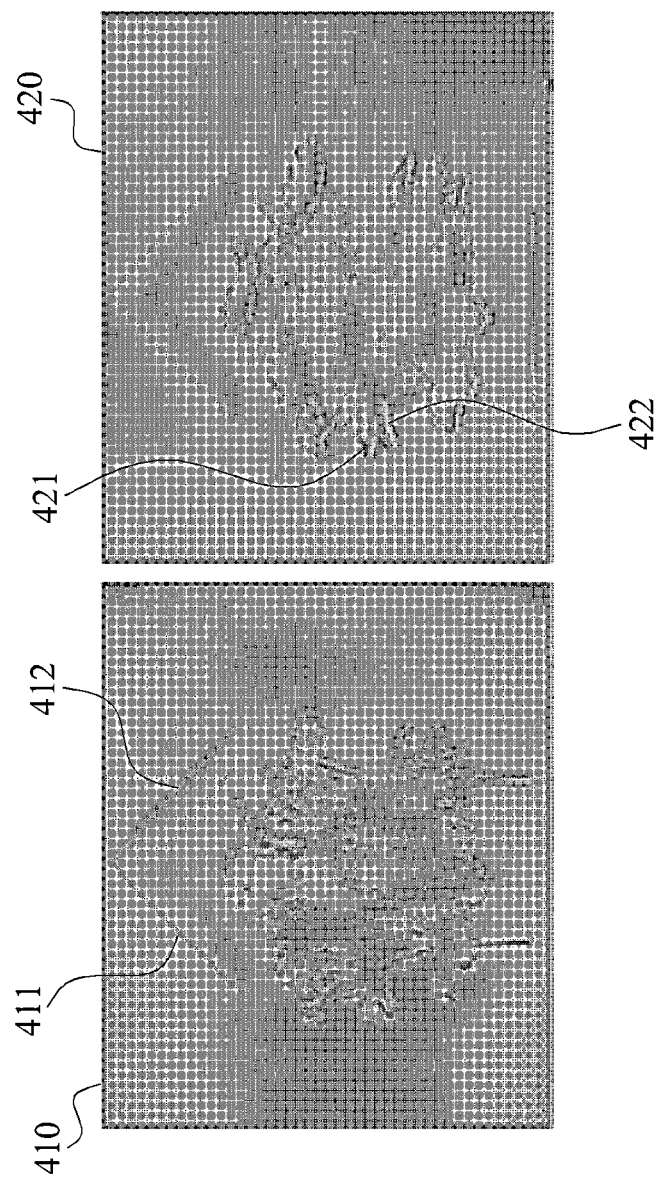
FIG. 4 illustrates an example of the surface information generated according to example embodiments.

FIG. 4 illustrates an example of surface information generated according to example embodiments.

The surface information determination unit 120 may determine values of the normal vector determined using Equation 3 or the unit vector of the normal vector determined using Equation 4, the values classified according to directions, as the surface information.

That is, the surface information determination unit 120 may determine at least one of X-direction normal vector component information 410, Y-direction normal vector component information 420, and Z-direction normal vector component information, as the surface information.

In detail, the surface information determination unit 120 may generate the X-direction normal vector component information 410 using X-axis values of the normal vector or the unit vector of the normal vector. Also, the surface information determination unit 120 may generate the Y-direction normal vector component information 420 using Y-axis values of the normal vector or the unit vector of the normal vector.

Because Z-axis values of the normal vector or the unit vector of the normal vector are the same as depth information included in a depth image, the surface information determination unit 120 may omit generation of the Z-direction normal vector component information.

On the X-axis of the normal vector or the unit vector of the normal vector, a positive direction may denote the right side and a negative direction may denote the left side. Here, a region 412 in which the object surface is directed to the right may be shown in white in the X-axis normal vector component information 410. A region 411 in which the object surface is directed to the left may be shown in black in the X-axis normal vector component information 410.

In addition, on the Y-axis of the normal vector or the unit vector of the normal vector, a positive direction may denote a lower side and a negative direction may denote an upper side. Here, a region 422 in which the object surface is directed to the upper side may be shown in white in the Y-direction normal vector component information 420. A region 421 in which the object surface is directed to the lower side may be shown in black in the Y-axis normal vector component information 420.

That is, because the surface information determination unit 120 determines the X-direction normal vector component information 410 and the Y-direction normal vector component information 420 as the surface information, the surface information may clearly show the directions of the object surfaces.

Figure 5:
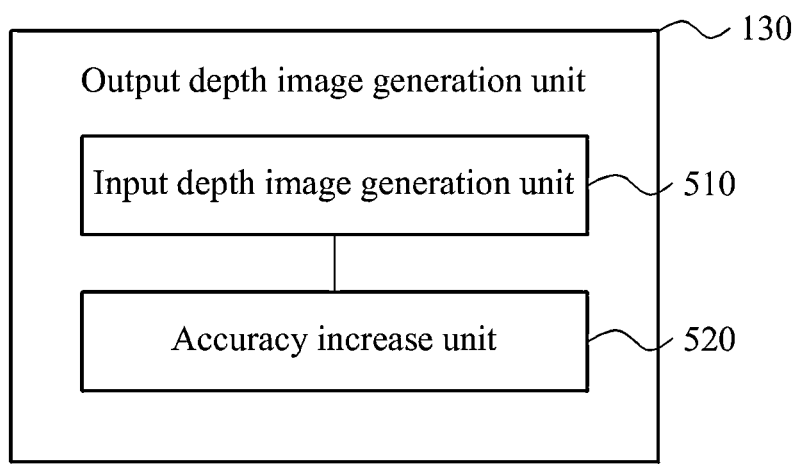
FIG. 5 illustrates configuration of an output depth image generation unit according to example embodiments.

FIG. 5 illustrates configuration of an output depth image generation unit 130 according to example embodiments.

Referring to FIG. 5, the output depth image generation unit 130 may include an input depth image generation unit 510 and an accuracy increase unit 520.

The input depth image generation unit 510 may generate an input depth image using the plurality of original depth images generated together with the intensity images according to the position of the light sources.

When the depth camera 101 generates the first intensity image to the fourth intensity image by varying the position of the light sources as aforementioned, the depth camera 101 may generate the first depth image to the fourth depth image using the first intensity image to the fourth intensity image.

Here, the input depth image generation unit 510 may generate an output depth image having a mean value of the first depth image to the fourth depth image. In addition, when saturation regions included in the plurality of original depth images are in different positions, the input depth image generation unit 510 may generate an output depth image from which the saturation region is removed, by combining the plurality of original depth images. Here, the saturation region removal unit 140 may not be used.

In addition, when the level of noise and the size of the saturation region included in the plurality of original depth images are different, the input depth image generation unit 510 may generate the output depth image from which the saturation region is removed, by combining the plurality of original depth images. Here, the noise and region removal unit 150 may not be used.

The accuracy increase unit 520 may increase accuracy of the object included in the input depth image using the surface information determined by the surface information determination unit 120.

Figure 6:
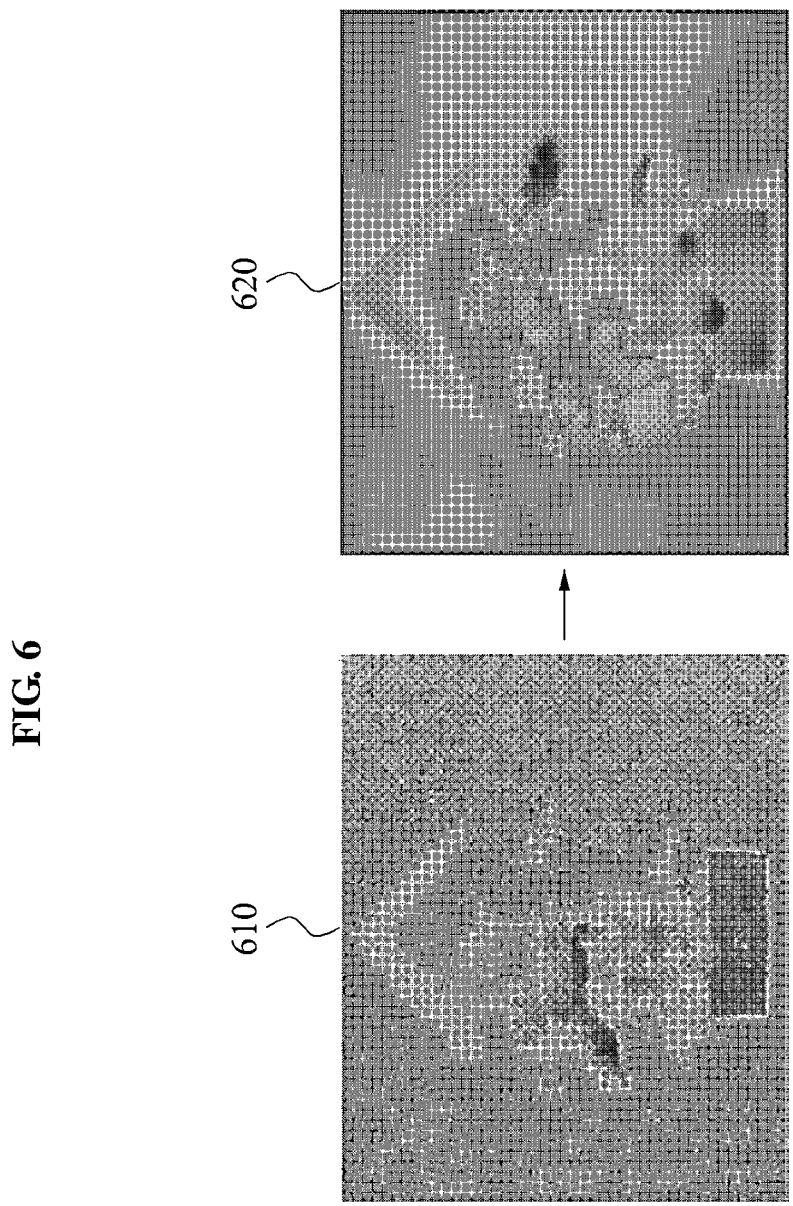
FIG. 6 illustrates a process of generating an output depth image according to example embodiments.

FIG. 6 illustrates a process of generating an output depth image 620 according to example embodiments.

As shown in FIG. 6, the output depth image generation unit 130 may generate the output depth image 620 with an increased accuracy, using the surface information determined by the surface information determination unit 120 with respect to an input depth image 610.

Figure 7:
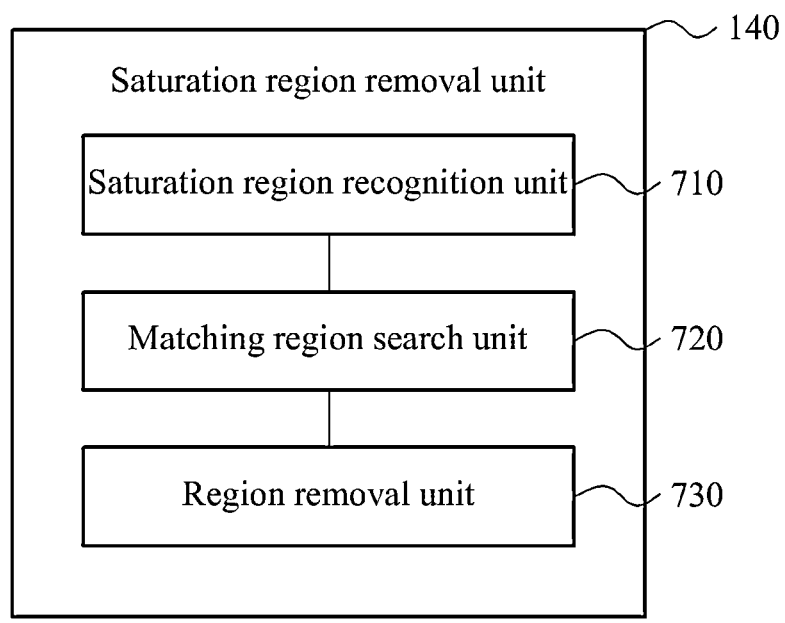
FIG. 7 illustrates configuration of a saturation region removal unit according to example embodiments.

FIG. 7 illustrates configuration of a saturation region removal unit 140 according to example embodiments.

Referring to FIG. 7, the saturation region removal unit 140 may include a saturation region recognition unit 710, a matching region search unit 720, and a region removal unit 730.

The saturation region recognition unit 710 may recognize a saturation region in each of the plurality of original depth images, in which the saturation regions are in respectively different positions, and a saturation region in the output depth image.

Here, the plurality of original depth images having the respectively different positions of the saturation regions may be original depth images generated by photographing the object by the depth camera 101 according to the position of the light sources.

The matching region search unit 720 may search for matching regions corresponding to the saturation region of the output depth image from the plurality of original depth images.

In detail, the matching region search unit 720 may determine whether matching regions being found are included in the saturation region of each of the original depth images, and select a matching region not included in the saturation region of each of the original depth images among the matching regions found from the original depth images.

The region removal unit 730 may add depth information of the matching region selected by the matching region search unit 720 to the saturation region of the output depth image, thereby removing the saturation region from the output saturation region.

Figure 8:
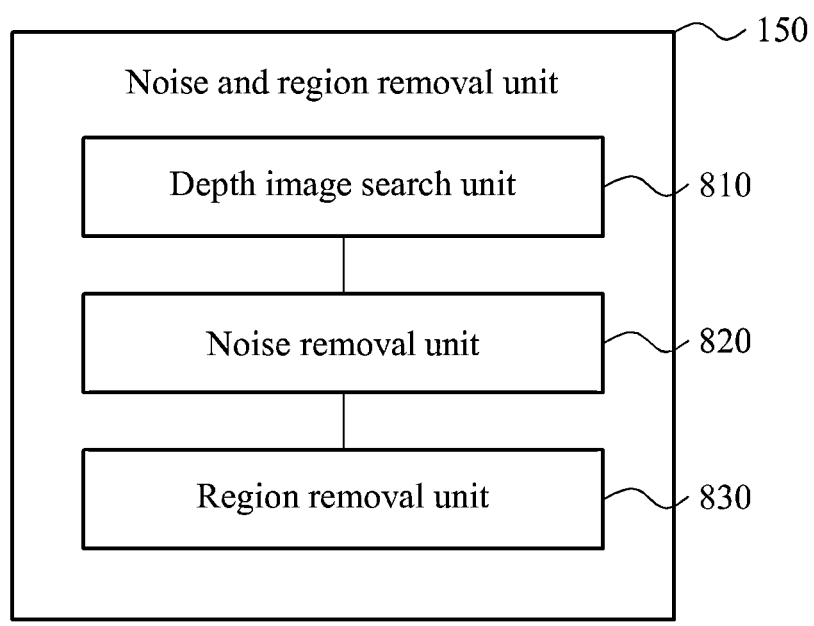
FIG. 8 illustrates configuration of a noise and region removal unit according to example embodiments.

FIG. 8 illustrates configuration of a noise and region removal unit 150 according to example embodiments.

Referring to FIG. 8, the noise and region removal unit 150 may include a depth image search unit 810, a noise removal unit 820, and a region removal unit 830.

The depth image search unit 810 may search for a first depth image having a lowest level of noise and a second depth image having a smallest size of a saturation region from the plurality of original depth images. Here, the plurality of original depth images, generated by photographing the object according to the number of the light sources, may have different levels of noise and different sizes of the saturation region, respectively.

When the number of light sources is increased, quantity of the received light reflected from the object is increased. Accordingly, in a depth image generated by a TOF depth camera, noise may be reduced and the saturation region may be increased. Therefore, the depth image search unit 810 may search for a depth image having a largest number of light sources used for generation of the depth image as the first depth image.

Conversely, when the number of light sources is decreased, noise may be increased and the saturation region may be reduced in the depth image generated by the TOF depth camera because quantity of the received light reflected by the object is decreased. Therefore, the depth image search unit 810 may search for a depth image having a smallest number of light sources used for generation of the depth image as the second depth image.

The noise removal unit 820 may remove noise of the output depth image by comparing the output depth image with the first depth image found by the depth image search unit 810.

In detail, the noise removal unit 820 may remove the noise of the output depth image, by searching the first depth image for a region corresponding to a noise generation position of the output depth image and inserting information on a found region into the noise generation position of the output depth image.

The region removal unit 830 may remove the saturation region of the output depth image by comparing the output depth image with the second depth image found by the depth image search unit 810.

In detail, the region removal unit 830 may remove the saturation region of the output depth image, by searching the second depth image for a region corresponding to the saturation region of the output depth image and inserting information on a found region into the saturation region of the output depth image.

Figure 9:
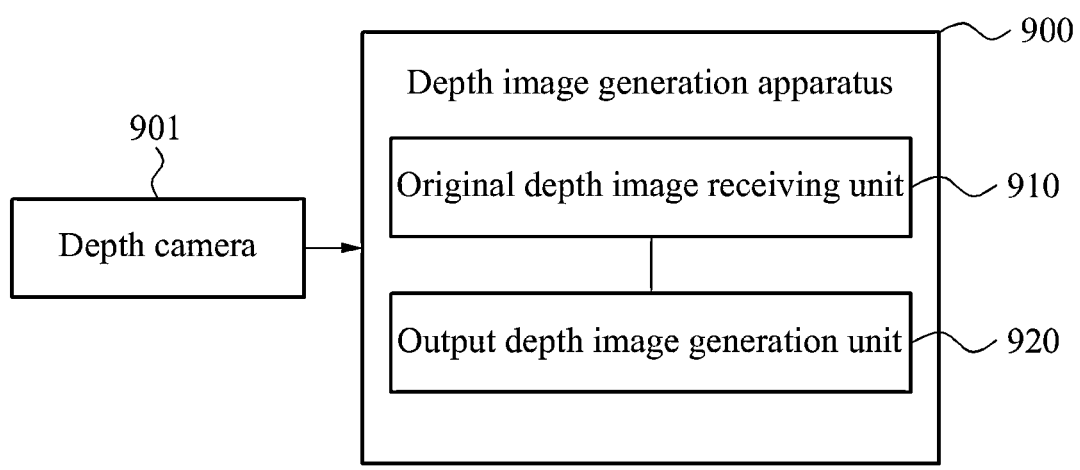
FIG. 9 illustrates configuration of a depth image generation apparatus according to example embodiments.

FIG. 9 illustrates configuration of a depth image generation apparatus 900 according to example embodiments.

FIG. 9 shows an example of generating a depth image from which a saturation region is removed, using depth images with different positions of light sources.

Referring to FIG. 9, the depth image generation apparatus 900 may include an original depth image receiving unit 910 and an output depth image generation unit 920.

The original depth image receiving unit 910 may receive a plurality of original depth images generated by photographing an object by a depth camera 901 according to the position of the light sources.

The original depth images generated by the depth camera 901 may have respectively different positions of a saturation region.

The output depth image generation unit 920 may generate an output depth image from which a saturation region is removed, using the plurality of original depth images received by the original depth image receiving unit 910.

The configuration and operation of the output depth image generation unit 920 will be described in detail with reference to FIG. 11.

Figure 10:
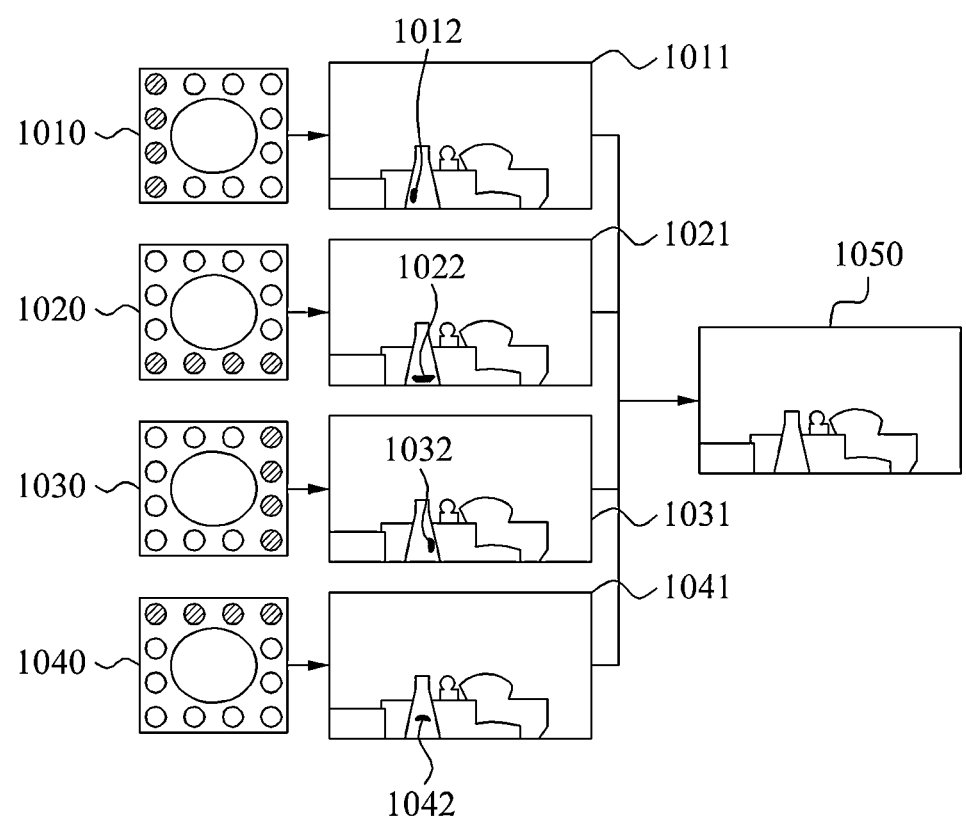
FIG. 10 illustrates a process of removing a saturation region using a depth image according to position of light sources, according to example embodiments.

FIG. 10 illustrates a process of removing a saturation region using a depth image according to position of light sources, according to example embodiments.

The depth camera 901 may generate an original depth image 1011 including a saturation region 1012 located at a left side of an object, using only left light sources 1010 among the light sources.

The depth camera 901 may generate an original depth image 1021 including a saturation region 1022 located at a lower part of an object, using only lower light sources 1020 among the light sources.

Additionally, the depth camera 901 may generate an original depth image 1031 including a saturation region 1032 located at a right side of an object, using only right light sources 1030 among the light sources.

Also, the depth camera 901 may generate an original depth image 1041 including a saturation region 1042 located at an upper part of an object, using only upper light sources 1040 among the light sources.

The original depth images 1011, 1021, 1031, and 1041 may have different positions of the saturation region from one another. Therefore, using the plurality of original depth images, the output depth image generation unit 920 may recover information not expressed by the saturation region.

For example, depth information corresponding to the saturation region 1012 may be absent from the original depth image 1011. However, at least one of the original depth images 1021, 1031, and 1041 may include the depth information corresponding to the saturation region 1012.

Accordingly, the output depth image generation unit 920 may extract the depth information corresponding to the saturation region 1012 from at least one of the original depth images 1021, 1031, and 1041. Next, the output depth image generation 920 may generate an output depth image 1050 without a saturation region by inserting the extracted depth information into the original depth image 1011.

Although the output depth image 1050 is generated using the original depth image 1011 in the foregoing example, the output depth image generation unit 920 may use any of the original depth image 1021, 1031, and 1041 to generate the output depth image 1050.

Here, the output depth image generation unit 920 may extract depth information corresponding to a saturation region of a depth image being used from the original depth images 1011, 1021, 1031, and 1041. Next, the output depth image generation unit 920 may generate the output depth image 1050 without the saturation region, by inserting the extracted depth information into the original depth image 1011.

Figure 11:
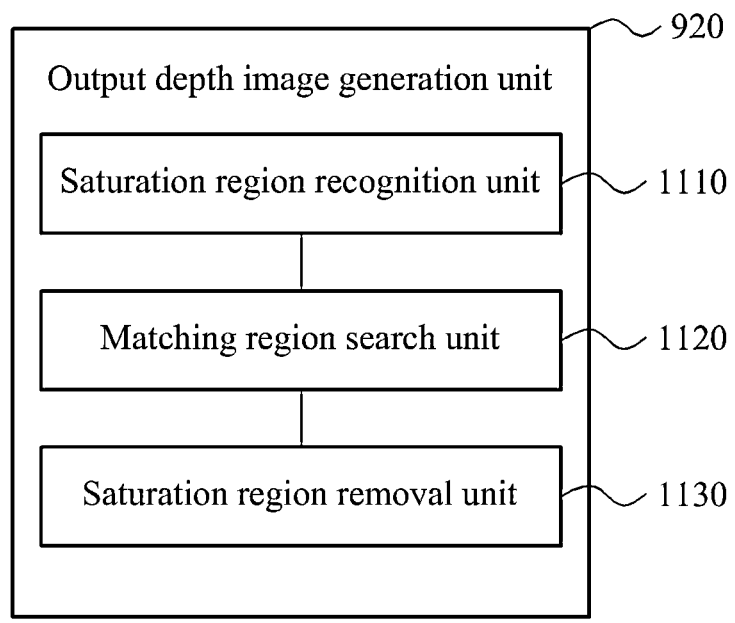
FIG. 11 illustrates configuration of an output depth image generation unit according to example embodiments.

FIG. 11 illustrates configuration of an output depth image generation unit 920 according to example embodiments.

Referring to FIG. 11, the output depth image generation unit 920 may include a saturation region recognition unit 1110, a matching region search unit 1120, and a saturation region removal unit 1130.

The saturation region recognition unit 1110 may recognize the saturation region of the first depth image among the plurality of depth images. The first depth image may be one of the plurality of depth images.

In addition, the saturation region recognition unit 1110 may recognize the saturation region of each of the plurality of depth images.

The matching region search unit 1120 may search for matching the regions corresponding to the saturation region of the first depth image recognized by the saturation region recognition unit 1110 from the plurality of original depth images. In detail, the matching region search unit 1120 may determine whether the matching regions being found are included in the saturation region of each of the original depth images. Next, the matching region search unit 1120 may select the matching region not included in the saturation region of each of the original depth images among the matching regions found from the original depth images.

The saturation region removal unit 1130 may generate the output depth image from which the saturation region is removed, by adding depth information of the matching region selected by the matching region search unit 1120 to the saturation region of the first depth image.

Figure 12:
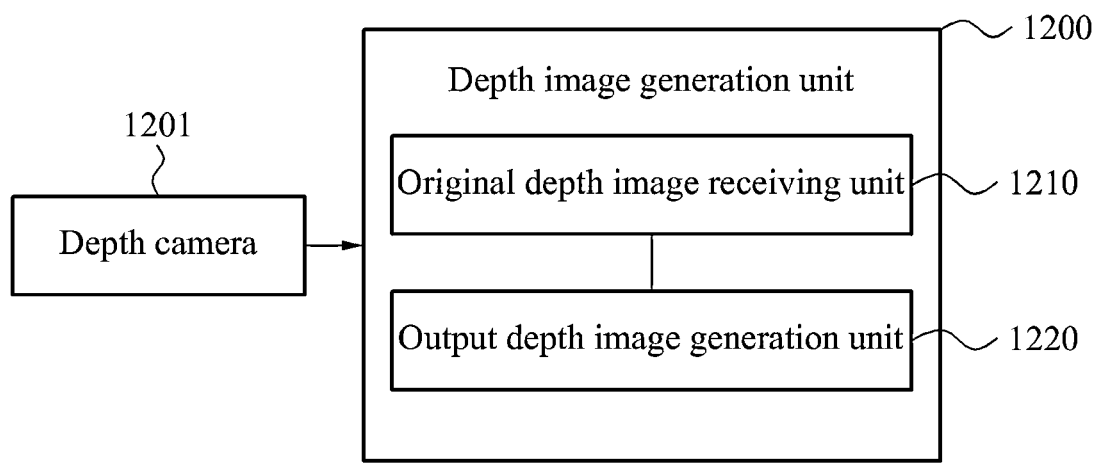
FIG. 12 illustrates configuration of a depth image generation apparatus according to other example embodiments.

FIG. 12 illustrates configuration of a depth image generation apparatus 1200 according to other example embodiments.

FIG. 12 shows an example of generating a depth image from which noise and a saturation region are removed, using depth images having different numbers of light sources.

Referring to FIG. 12, the depth image generation apparatus 1200 may include an original depth image receiving unit 1210 and an output depth image generation unit 1220.

The original depth image receiving unit 1210 may receive a plurality of original depth images generated by photographing an object by a depth camera 1201 according to the number of the light sources.

Here, the original depth images generated by the depth camera 1201 may have different sizes of a saturation region and different levels of noise.

The output depth image generation unit 1220 may generate an output depth image of which a level of the noise and a size of the saturation region are minimized, using the plurality of original depth images received by the original depth image receiving unit 1210.

The configuration and operation of the output depth image generation unit 1220 will be described in detail with reference to FIG. 15.

Figure 13:
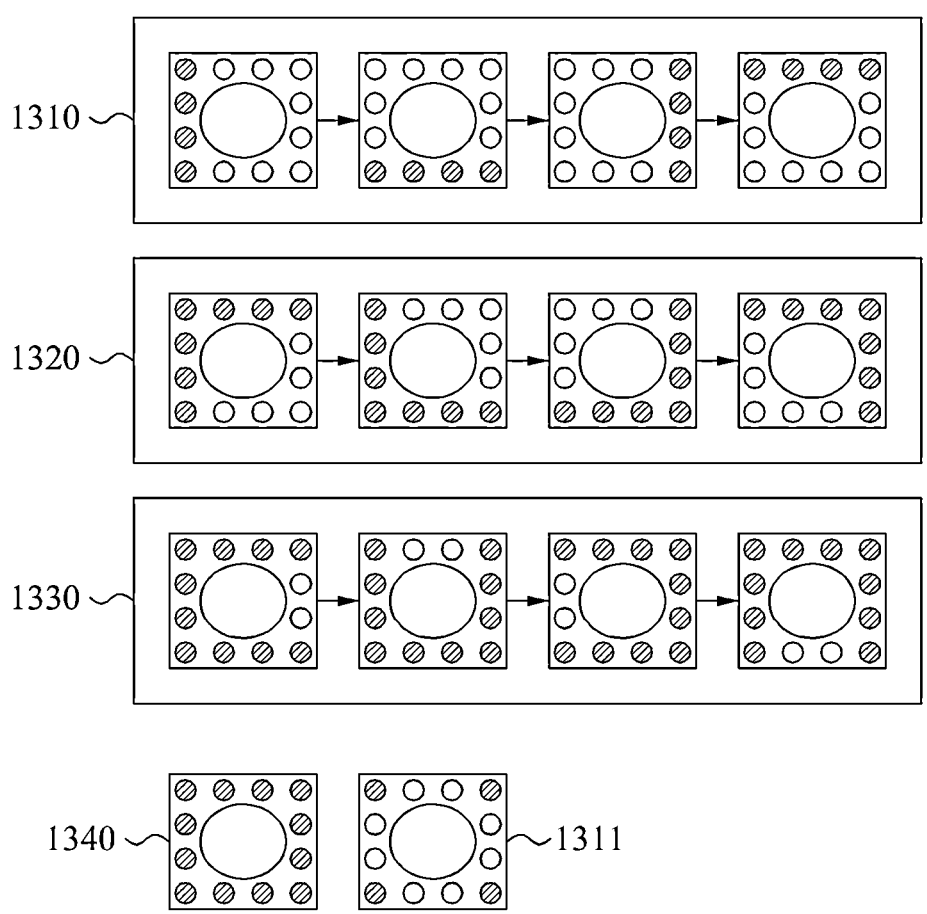
FIG. 13 illustrates a process of changing position or a number of light sources, according to example embodiments.

FIG. 13 illustrates a process of changing a position or a number of light sources, according to example embodiments.

As shown in FIG. 13, the depth camera 1201 may change the number and the position of the light sources used for generation of a depth image.

First, the depth camera 1201 may generate an original depth image using only four light sources among the light sources.

In detail, as shown in FIG. 13, the depth camera 1201 may turn on four light sources located at one side and change a position of four light sources turned on, in operation 1310.

Next, the depth camera 1201 may generate the original depth image using only seven light sources among the light sources. Here, a light source number change unit may change position of the light sources turned on as shown in FIG. 13, in operation 1320.

Next, the depth camera 1201 may generate the original depth image using only ten light sources among the light sources. Here, the light source number change unit may change position of the light sources turned on as shown in FIG. 13, in operation 1330.

At last, the depth camera 1201 may generate the original depth image using all of the light sources in operation 1340.

Here, the depth camera 1201 may generate the original depth image every time the position or the number of the light sources turned on is changed. Therefore, the output depth image generation unit 1220 may generate the output depth image of which a level of the noise and a size of the saturation region are minimized using thirteen original depth images.

In addition, the depth camera 1201 may generate the original depth image using four light sources disposed at corners among the light sources in operation 1311. Next, the depth camera 1201 may generate the output depth image using all of the light sources in operation 1340. Here, the output depth image generation unit 1220 may generate the output depth image of which the level of the noise and the size of the saturation region are minimized, using one original depth image with four light sources and one original depth image with twelve light sources.

Figure 14:
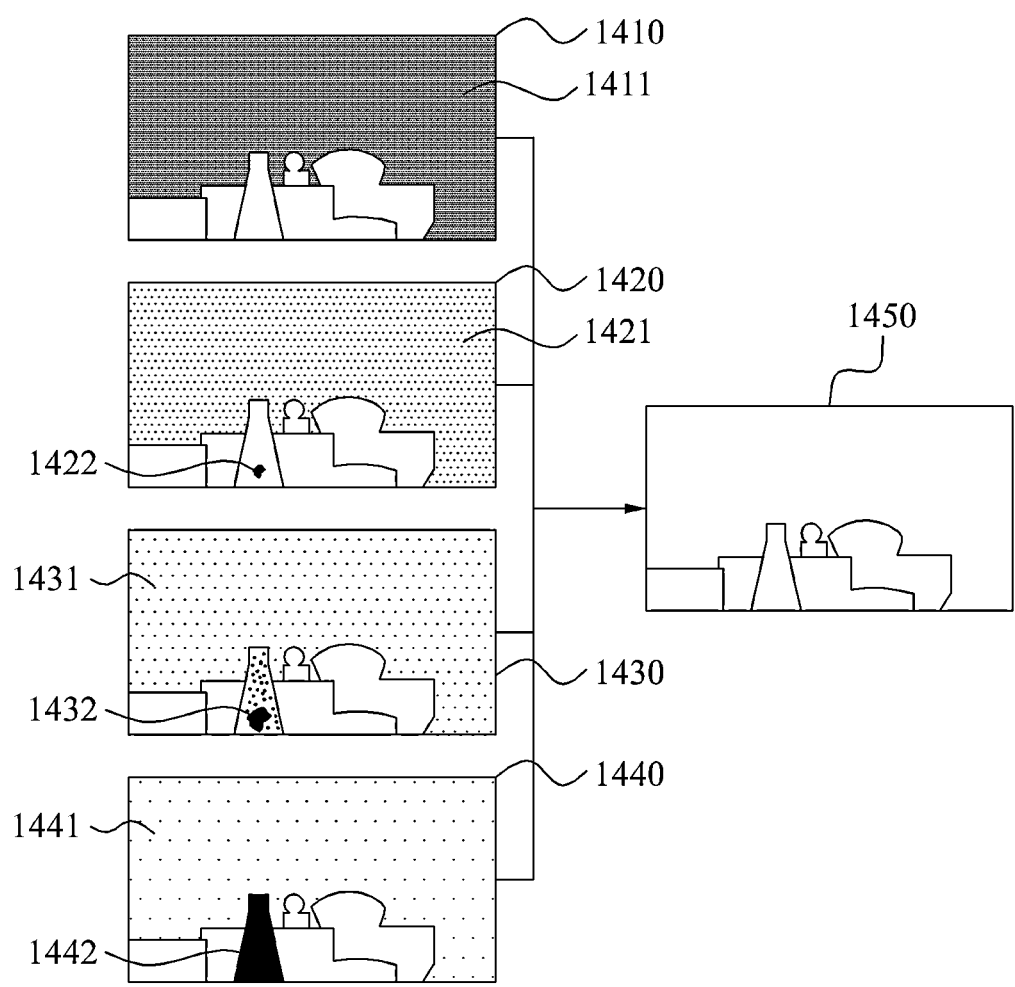
FIG. 14 illustrates a process of removing noise and a saturation region using a depth image according to the number of light sources, according to example embodiments.

FIG. 14 illustrates a process of removing noise and a saturation region using a depth image according to the number of light sources, according to example embodiments.

When the number of the light sources is four, an original depth image 1410 generated by the depth camera 1201 may include no saturation region and a large amount of noise 1411.

When the number of the light sources is seven, an original depth image 1420 generated by the depth camera 1201 may include a saturation region 1422 and noise 1421 less than in the original depth image 1410.

When the number of the light sources is ten, an original depth image 1430 generated by the depth camera 1201 may include a saturation region 1432 greater than in the original depth image 1420 and noise 1431 less than in the original depth image 1420.

Finally, when the number of the light sources is twelve, an original depth image 1440 generated by the depth camera 1201 may include a saturation region 1442 greater than in the original depth image 1430 and noise 1441 less than in the original depth image 1430.

Here, the output depth image generation unit 1220 may generate an output depth image 1450 including no noise and no saturation region using the original depth image 1410 to the original depth image 1440.

For example, the output depth image generation unit 1220 may extract depth information corresponding to the saturation region 1442 of the original depth image 1440 including a lowest level of noise from the original depth image 1410 including no saturation region. Next, the output depth image generation unit 1220 may generate the output depth image 1450 including no noise and no saturation region by inserting the depth information into the saturation region 1442 of the original depth image 1440 including the lowest level of noise.

In addition, alternatively, the output depth image generation unit 1220 may generate the output depth image 1450 including no noise and no saturation region, by comparing the original depth image 1410 including no saturation region with the original depth image 1440 including the lowest level of noise and removing the noise from the original depth image 1410.

Also, the output depth image generation unit 1220 may generate the output depth image 1450 including no noise and no saturation region, by combining the original depth image 1410 to the original depth image 1440.

Figure 15:
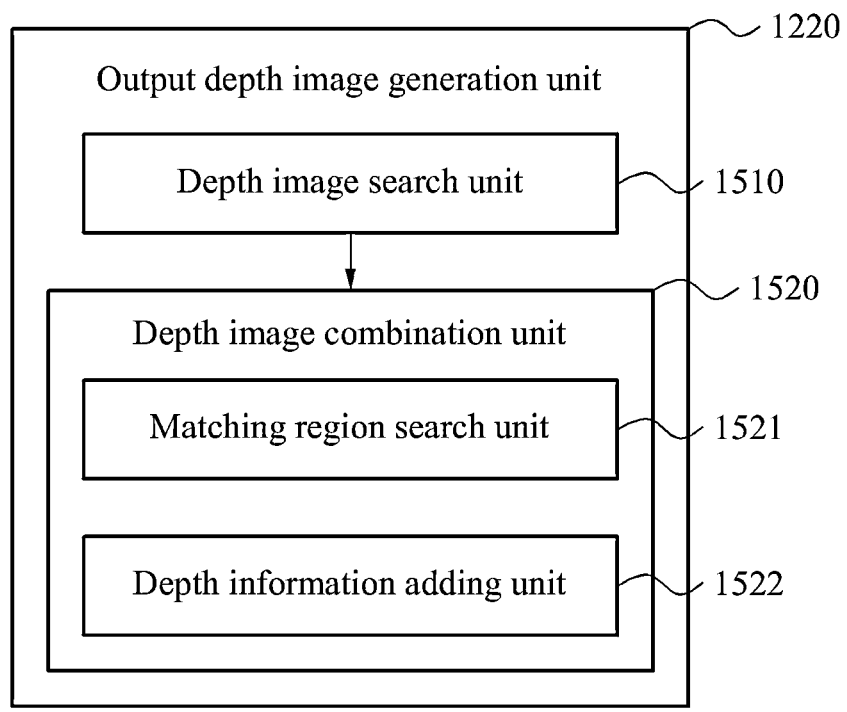
FIG. 15 illustrates configuration of an output depth image generation unit according to other example embodiments.

FIG. 15 illustrates configuration of an output depth image generation unit 1220 according to other example embodiments.

Referring to FIG. 15, the output depth image generation unit 1220 may include a depth image search unit 1510 and a depth image combination unit 1520.

The depth image search unit 1510 may search for a first depth image having a lowest level of noise and a second depth image having a smallest size of a saturation region among a plurality of depth images. Here, the second depth image may include depth information corresponding to a saturation region included in the first depth image.

The depth image combination unit 1520 may generate an output depth image by combining the first depth image and the second depth image found by the depth image search unit 1510. Alternatively, the depth image combination unit 1520 may generate an output depth image including no noise and no saturation region by combining all of the plurality of depth images.

In case in which the output depth image is generated using depth information of the second depth image, the depth image combination unit 1520 may include a matching region search unit 1521 and a depth information adding unit 1522.

The matching region search unit 1521 may search for matching regions corresponding to the saturation region included in the first depth image from the second depth image.

The depth information adding unit 1522 may generate the output depth image by adding depth information of the matching regions to the saturation region included in the first depth image.

Figure 16:
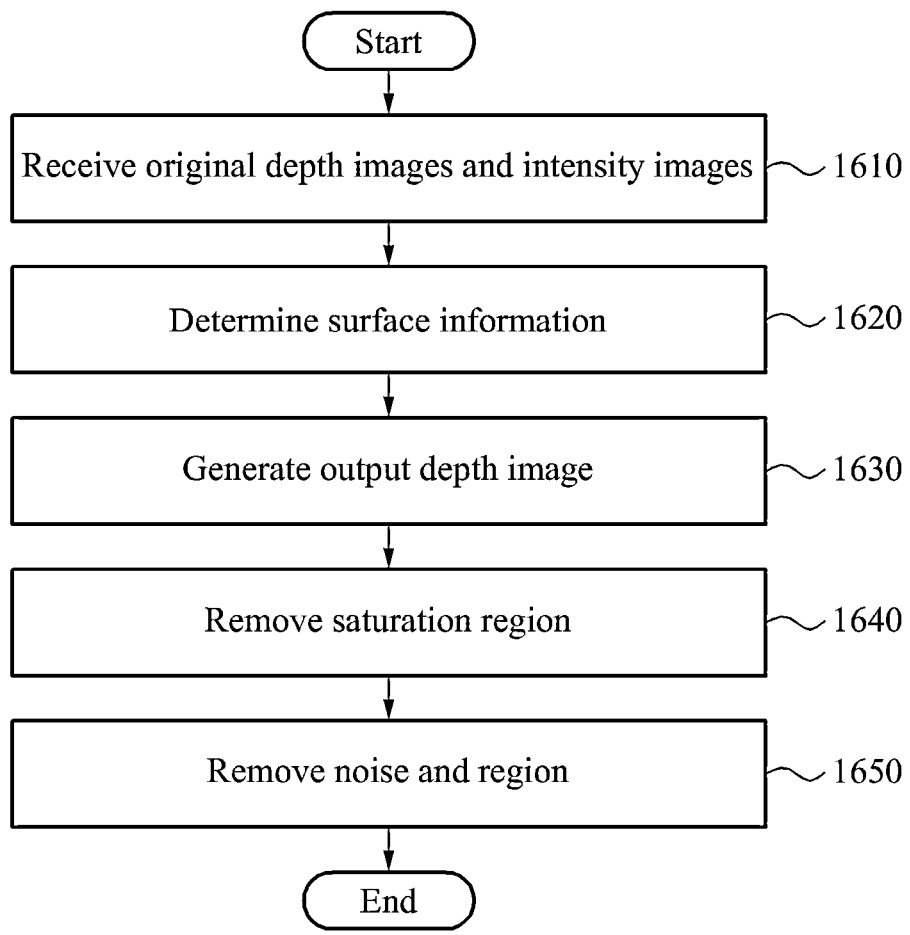
FIG. 16 illustrates a depth image generation method according to example embodiments.

FIG. 16 illustrates a depth image generation method according to example embodiments.

In operation 1610, the image receiving unit 110 may receive a plurality of intensity images and a plurality of original depth images generated by photographing an object by a depth camera 101 according to position of light sources. Positions of saturation regions of the plurality of intensity images may be different from one another.

The image receiving unit 110 may receive a plurality of original depth images generated by photographing the object by a depth camera 101 according to a number of light sources. In this case, the plurality of intensity images may have respectively different sizes of the saturation region and different levels of noise.

In operation 1620, the surface information determination unit 120 may determine surface information related to an object surface using the plurality of intensity images received in operation 1610.

In operation 1630, the output depth image generation unit 130 may generate the output depth image with an increased accuracy using the original depth images received in operation 1610 and the surface information determined in operation 1620.

In operation 1640, the saturation region removal unit 140 may remove a saturation region from the output depth image generated in operation 1630 using the plurality of original depth images received in operation 1610.

In operation 1650, the noise and region removal unit 150 may remove noise and the saturation region of the output depth image generated in operation 1630, using the plurality of original depth images received in operation 1610.

Operations 1640 and 1650 may be performed in parallel or the order may be reversed. Also, operations 1640 and 1650 may be even omitted.

Figure 17:
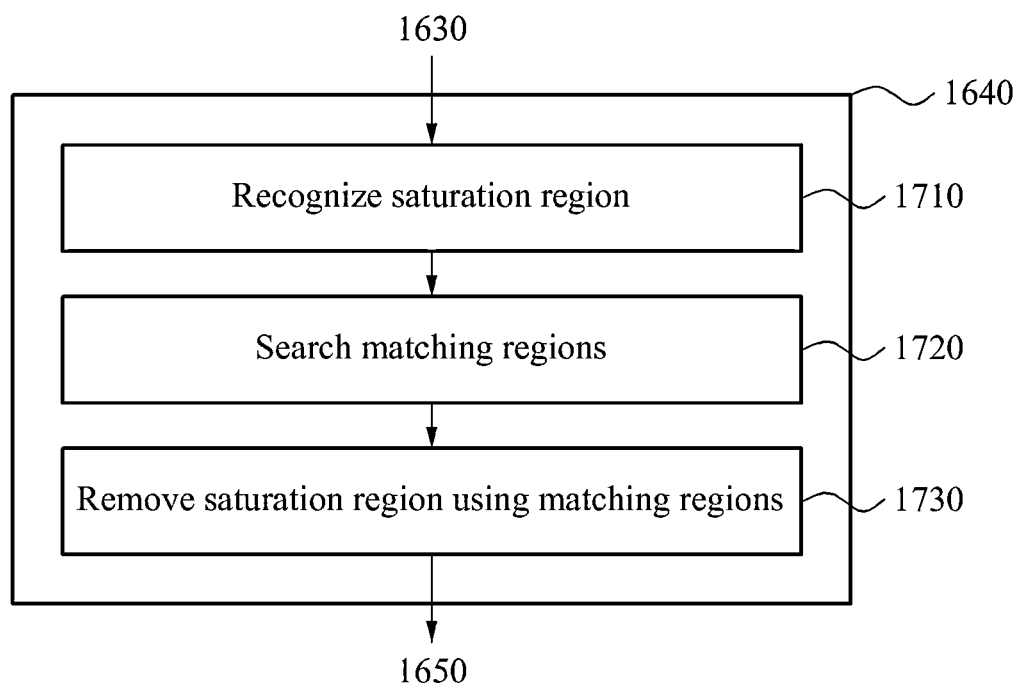
FIG. 17 illustrates a method of removing a saturation region, according to example embodiments.

FIG. 17 illustrates a method of removing a saturation region, according to example embodiments. Operations 1710 to 1730 of FIG. 17 may be included in operation 1640 of FIG. 16.

In operation 1710, the saturation region recognition unit 710 may recognize the saturation region in each of the plurality of original depth images, in which the saturation regions are in respectively different positions, and the saturation region in the output depth image.

In operation 1720, the matching region search unit 720 may search for matching regions corresponding to the saturation region of the output depth image recognized in operation 1710 from the plurality of original depth images.

In detail, the matching region search unit 720 may determine whether matching regions being found are included in the saturation region of each of the original depth images, and select the matching region not included in the saturation region of each of the original depth images among the matching regions found from the original depth images.

In operation 1730, the region removal unit 730 may add the depth information of the matching region selected in operation 1720 to the saturation region of the output depth image recognized in operation 1710, thereby removing the saturation region from the output saturation region.

Figure 18:
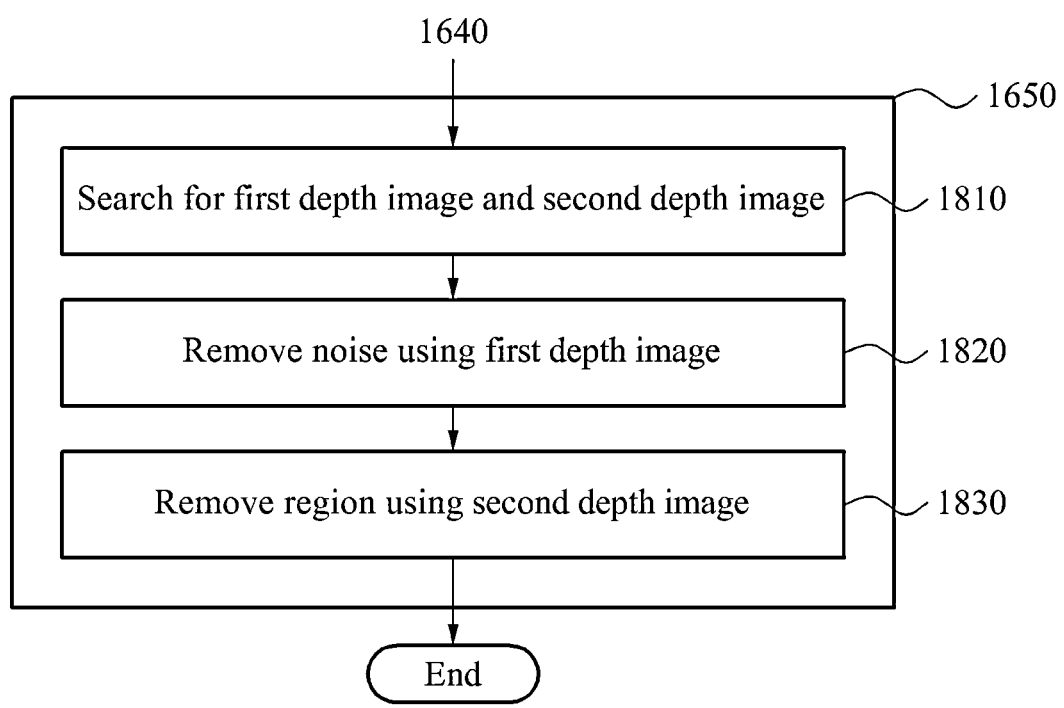
FIG. 18 illustrates a method of removing noise and a saturation region, according to example embodiments.

FIG. 18 illustrates a method of removing noise and a saturation region according to example embodiments. Operations 1810 to 1830 of FIG. 18 may be included in operation 1650 of FIG. 16.

In operation 1810, the depth image search unit 810 may search for the first depth image having the lowest level of noise and the second depth image having the smallest size of the saturation region from the plurality of original depth images.

In operation 1820, the noise removal unit 820 may remove the noise of the output depth image by comparing the output depth image with the first depth image found in operation 1810.

In detail, the noise removal unit 820 may remove the noise of the output depth image, by searching the first depth image for a region corresponding to a noise generation position of the output depth image and inserting information on a found region into the noise generation position of the output depth image.

In operation 1830, the region removal unit 830 may remove the saturation region of the output depth image by comparing the output depth image with the second depth image found in operation 1810.

In detail, the region removal unit 830 may remove the saturation region, by searching the second depth image for the region corresponding to the saturation region of the output surface and inserting information on the found region into the saturation region of the output depth image.

Figure 19:
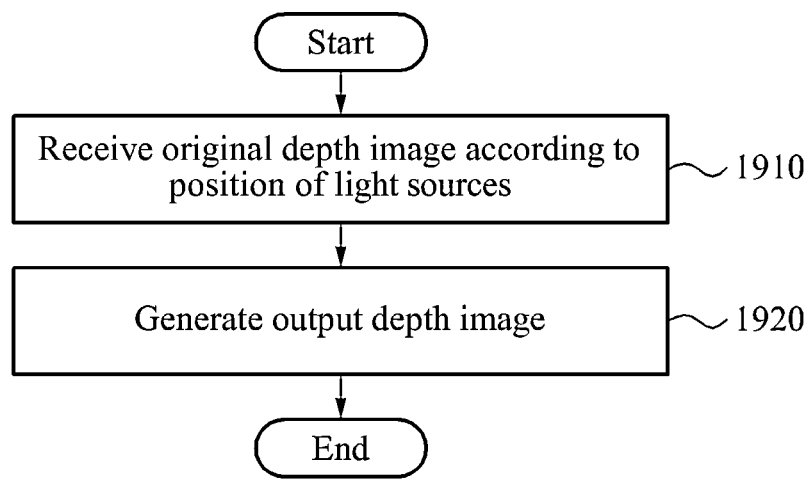
FIG. 19 illustrates a depth image generation method according to other example embodiments.

FIG. 19 illustrates a depth image generation method according to other example embodiments.

In operation 1910, the original depth image receiving unit 910 may receive the plurality of original depth images generated by photographing the object by the depth camera 901 according to the position of the light sources.

Here, the original depth images received by the original depth image receiving unit 910 may have respectively different positions of the saturation region.

In operation 1920, the output depth image generation unit 920 may generate the output depth image from which the saturation region is removed, using the plurality of original depth images received in operation 1910.

Figure 20:
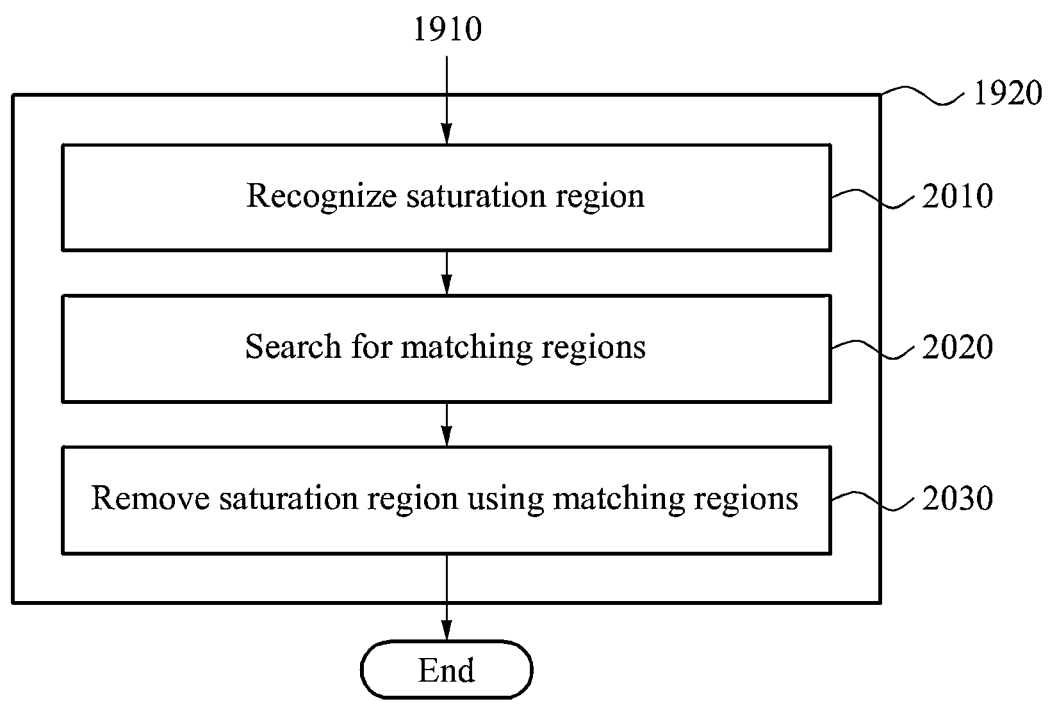
FIG. 20 illustrates an output depth image generation method according to example embodiments.

FIG. 20 illustrates an output depth image generation method according to example embodiments. Operations 2010 to 2030 of FIG. 20 may be included in operation 1920 of FIG. 19.

In operation 2010, the saturation region recognition unit 1110 may recognize the saturation region of the first depth image among the plurality of depth images. Here, the first depth image may be one of the depth images.

In addition, the saturation region recognition unit 1110 may recognize the saturation region of each of the plurality of depth images.

In operation 2020, the matching region search unit 1120 may search for matching regions corresponding to the saturation region of the first depth image recognized in operation 2010 from the plurality of original depth images. In detail, the matching region search unit 1120 may determine whether matching regions being found are included in the saturation region of each of the original depth images.

Next, the matching region search unit 1120 may select a matching region not included in the saturation region of each of the original depth images among the matching regions found from the original depth images.

In operation 2030, the saturation region removal unit 1130 may generate the output depth image from which the saturation region is removed, by adding depth information of the matching region selected in operation 2020 to the saturation region of the first depth image recognized in operation 2010.

Figure 21:
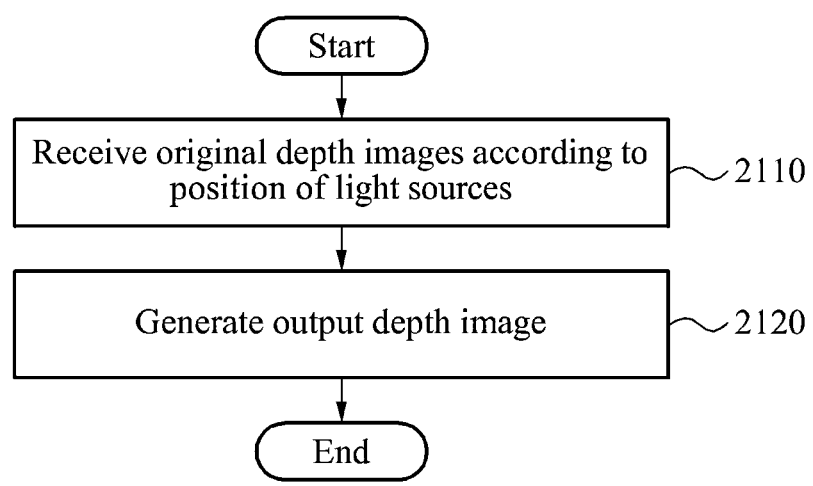
FIG. 21 illustrates a depth image generation method according to still other example embodiments.

FIG. 21 illustrates a depth image generation method according to still other example embodiments.

In operation 2110, the original depth image receiving unit 1210 may receive the plurality of original depth images generated by photographing the object by the depth camera 1201 according to the number of the light sources.

Here, the original depth images received by the original depth image receiving unit 1210 may have different sizes of a saturation region and different levels of noise.

In operation 2120, the output depth image generation unit 1220 may generate the output depth image of which the level of the noise and the size of the saturation region are minimized, using the plurality of original depth images received in operation 2110.

Figure 22:
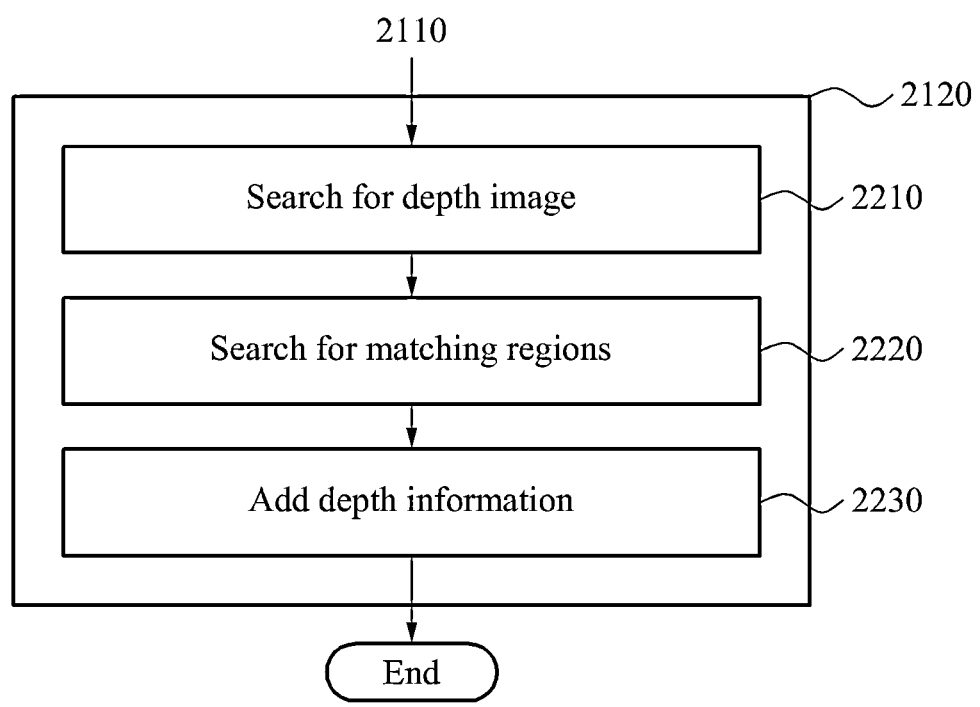
FIG. 22 illustrates an output depth image generation method according to other example embodiments.

FIG. 22 illustrates an output depth image generation method according to other example embodiments. Operations 2210 to 2230 of FIG. 22 may be included in operation 2120 of FIG. 21.

In operation 2210, the depth image search unit 1510 may search for the first depth image having the lowest level of noise and the second depth image having the smallest size of the saturation region from the plurality of depth images.

In operation 2220, the matching region search unit 1521 may search for matching regions corresponding to the saturation region included in the first depth image from the second depth image found in operation 2210.

In operation 2230, the depth information adding unit 1522 may generate the output depth image by adding the depth information of the matching regions found in operation 2220 to the saturation region included in the first depth image.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A depth image generation apparatus comprising:
a processor configured to,
  determine surface information related to a surface of an object, using a plurality of intensity images generated according to positions of light sources, and
  generate an output depth image, using an original depth image and the surface information,
  wherein the processor is configured to,
    search for matching regions corresponding to a saturation region of the output depth image from a plurality of original depth images wherein the plurality of original depth images are generated according to the positions of the light sources, and
    remove the saturation region from the output depth image by adding depth information of the matching regions to the saturation region of the output depth image.

2. The depth image generation apparatus of claim 1, wherein the surface information comprises at least one of a normal vector of the object and a unit vector of the normal vector.

3. The depth image generation apparatus of claim 1, wherein the processor is configured to receive the plurality of original depth images generated according to the positions of the light sources.

4. The depth image generation apparatus of claim 3, wherein the processor is further configured to remove the saturation region from the output depth image using the plurality of original depth images.

5. The depth image generation apparatus of claim 1, wherein the processor is configured to recognize a saturation region in each of the plurality of original depth images, the saturation region of each of the plurality of original depth images being in respectively different positions.

6. The depth image generation apparatus of claim 1, wherein the processor is further configured to receive the plurality of original depth images generated according to a number of the light sources.

7. The depth image generation apparatus of claim 6, wherein the processor is further configured to remove noise and the saturation region from the output depth image generated using the plurality of original depth images.

8. The depth image generation apparatus of claim 7, wherein the processor is further configured to:
  search for a first depth image having a lowest level of noise and a second depth image having a smallest size of a saturation region among the plurality of original depth images;
  remove noise of the output depth image by comparing the output depth image with the first depth image; and
  remove the saturation region of the output depth image by further comparing the output depth image with the second depth image.

9. A depth image generation method comprising:
- determining surface information related to a surface of an object using a plurality of intensity images generated according to positions of light sources;
- generating an output depth image, using an original depth image and the surface information;
- searching for matching regions corresponding to a saturation region of the output depth image from a plurality of original depth images wherein the plurality of original depth images are generated according to the positions of the light sources; and
- removing the saturation region from the output depth image by adding depth information of the matching regions to the saturation region of the output depth image.

10. The depth image generation method of claim 9, wherein the surface information comprises at least one of a normal vector of the object and a unit vector of the normal vector.

11. The depth image generation method of claim 9, further comprising:
- receiving the plurality of original depth images generated according to the positions of the light sources.

12. The depth image generation method of claim 11, further comprising removing the saturation region from the output depth image using the plurality of original depth images.

13. The depth image generation method of claim 9, further comprising:
- recognizing a saturation region in each of the plurality of original depth images, the saturation region of each of the plurality of original depth images being in respectively different positions.

14. The depth image generation method of claim 9, further comprising generating the plurality of original depth images to have different sizes of a saturation region and different levels of noise, respectively, according to a number of the light sources.

15. The depth image generation method of claim 14, further comprising removing noise and the saturation region from the output depth image using the plurality of original depth images.

16. The depth image generation method of claim 15, further comprising searching for a first depth image having a lowest level of noise and a second depth image having a smallest size of a saturation region among the plurality of original depth images;
- removing noise of the output depth image by comparing the output depth image with the first depth image; and
- removing the saturation region of the output depth image by further comparing the output depth image with the second depth image.

17. A non-transitory computer readable recording medium storing a program to cause a computer to implement the method of claim 9.

* * * * *